US007759941B2

(12) United States Patent
Bosnar

(10) Patent No.: US 7,759,941 B2
(45) Date of Patent: Jul. 20, 2010

(54) GROUND CONDUCTIVITY METER WITH AUTOMATIC CALIBRATION

(75) Inventor: Miroslav Bosnar, Toronto (CA)

(73) Assignee: Geonics Limited, Mississauga, Ontario (CA)

( * ) Notice: Subject to any disclaimer, the term of this patent is extended or adjusted under 35 U.S.C. 154(b) by 402 days.

(21) Appl. No.: 12/027,594

(22) Filed: Feb. 7, 2008

(65) Prior Publication Data
US 2009/0201024 A1    Aug. 13, 2009

(51) Int. Cl.
*G01V 3/10* (2006.01)
*G01V 3/12* (2006.01)
(52) U.S. Cl. .................. 324/337; 324/334; 324/344
(58) Field of Classification Search ............ 324/323, 324/332, 334, 337, 344, 345; 702/2, 5
See application file for complete search history.

(56) References Cited

U.S. PATENT DOCUMENTS

| 4,070,612 | A   | * | 1/1978 | McNeill et al. ............ 324/334 |
| 4,109,199 | A   |   | 8/1978 | Ball et al. |
| 4,388,592 | A   |   | 6/1983 | Schonstedt et al. |
| 4,495,467 | A   |   | 1/1985 | Kuno et al. |
| 4,533,872 | A   |   | 8/1985 | Boord et al. |
| 6,335,617 | B1  |   | 1/2002 | Osadchy et al. |
| 6,534,985 | B2  | * | 3/2003 | Holladay et al. ............ 324/334 |
| 6,710,599 | B2  | * | 3/2004 | Bosnar ........................ 324/334 |
| 7,030,759 | B2  |   | 4/2006 | Nelson |
| 2003/0016131 | A1 |  | 1/2003 | Nelson |
| 2005/0104595 | A1 | * | 5/2005 | Nelson ........................ 324/327 |

OTHER PUBLICATIONS

Brochure—"Leaders in Electromagnetics, Geophysical Instrumentation for Exploration and the Environment", Geonics Limited, published Jan. 2006, Mississauga, Ontario, Canada.
"EM38 Ground Conductivity Meter Operating Manual"; Geonics Limited, published Jan. 2006, Mississauga, Ontario, Canada, pp. 6, 8 and 9.

* cited by examiner

*Primary Examiner*—Kenneth J Whittington
(74) *Attorney, Agent, or Firm*—Fay Sharpe LLP

(57) ABSTRACT

A ground conductivity meter that includes a transmitter coil and a receiver coil that are horizontally spaced apart from each other, and a conductivity meter controller connected to the transmitter and receiver coils and including an electronic storage element and at least one processor, the conductivity meter controller being operative to: determine a first conductivity reading in dependence on signals from the receiver coil when the transmitter coil and receiver coil are positioned a predetermined distance above a ground surface in one of a vertical dipole orientation or a horizontal dipole orientation; determine a second conductivity reading in dependence on signals from the receiver coil when the transmitter coil and receiver coil are positioned the predetermined distance above the ground surface in the other of the vertical dipole orientation or horizontal dipole orientation; calculate a correction factor in dependence on the first and second conductivity readings and store the correction factor in the storage element; and determine a plurality of further conductivity readings in dependence on signals from the receiver coil during a site survey, and apply the stored correction factor to the further conductivity readings to produce corrected conductivity readings for the site survey.

21 Claims, 8 Drawing Sheets

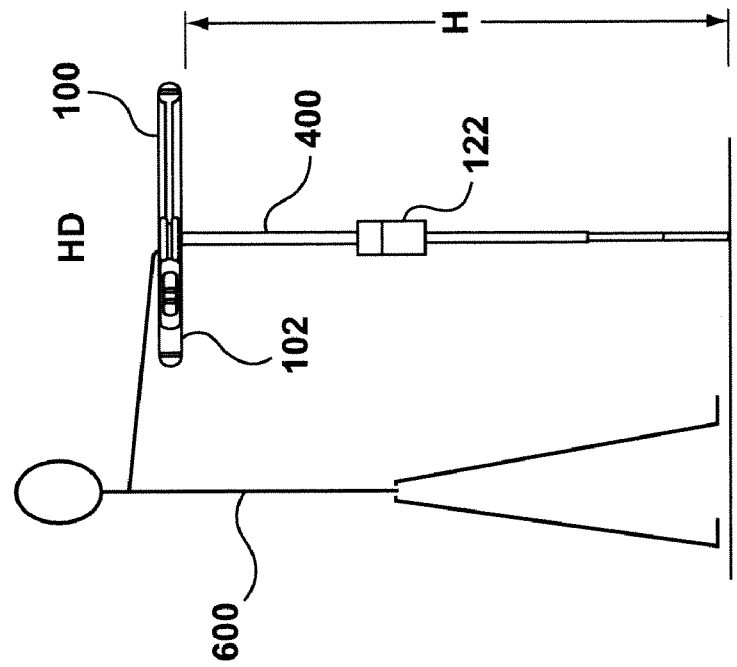
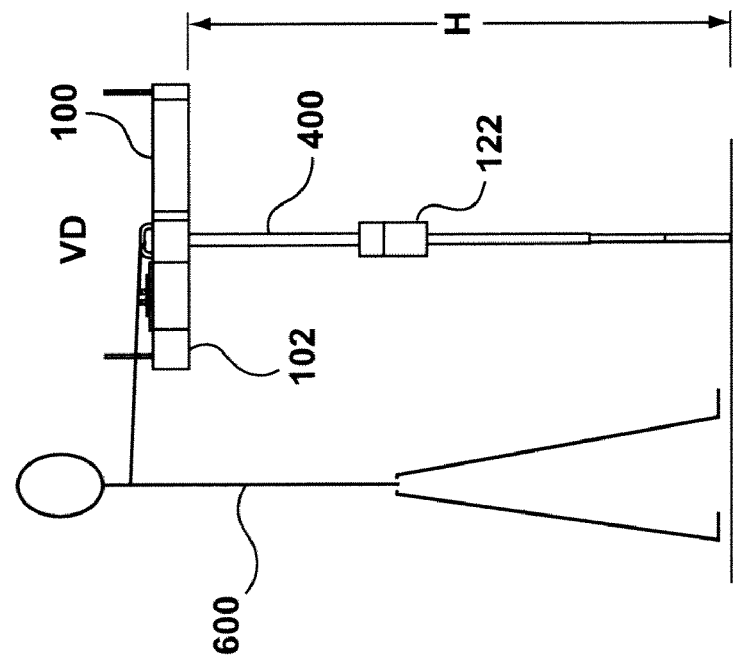

GROUND CONDUCTIVITY METER WITH AUTOMATIC CALIBRATION

BACKGROUND

Embodiments described herein relate to ground conductivity meters.

Ground conductivity meters are extensively used in a variety of fields, such as agriculture, archeology and groundwater exploration among others, for ground characterization due to their ease of use and noninvasive nature.

Ground conductivity meters typically rely on measurement of a ratio between an extremely small ground response signal to a relatively large signal emitted from a transmitter of the ground conductivity meter, and thus are sensitive instruments. The smaller the separation between the transmitter coil and the receiver coil the greater the sensitivity of the instrument to the primary field effects. Maintaining calibration of a ground conductivity meter over periods of time can be difficult, especially in an environment of changing operational conditions such as temperature.

Accordingly, improving the calibration of ground conductivity meters is desirable.

SUMMARY

According to one example embodiment, there is provided a ground conductivity meter that includes a transmitter coil and a receiver coil that are horizontally spaced apart from each other, and a conductivity meter controller connected to the transmitter and receiver coils and including an electronic storage element and at least one processor. The conductivity meter controller is operative to: determine a first conductivity reading in dependence on signals from the receiver coil when the transmitter coil and receiver coil are positioned a predetermined distance above a ground surface in one of a vertical dipole orientation or a horizontal dipole orientation; determine a second conductivity reading in dependence on signals from the receiver coil when the transmitter coil and receiver coil are positioned the predetermined distance above the ground surface in the other of the vertical dipole orientation or horizontal dipole orientation; calculate a correction factor in dependence on the first and second conductivity readings and store the correction factor in the storage element; and determine a plurality of further conductivity readings in dependence on signals from the receiver coil during a site survey, and apply the stored correction factor to the further conductivity readings to produce corrected conductivity readings for the site survey.

According to another example embodiment is a method for calibrating and operating a ground conductivity meter. The method includes providing a ground conductivity meter that has a transmitter coil and a receiver coil that are horizontally spaced apart from each other and that is configured to determine apparent conductivity readings for a terrain by using the transmitter coil to induce eddy currents in the terrain and the receiver coil to measure a secondary magnetic field generated in the terrain by the induced eddy currents, wherein error can be introduced into the apparent conductivity readings, and at a survey site, determining a correction factor for mitigating against the error introduced into the apparent conductivity readings. Determining the correction factor includes: determining a first apparent conductivity reading when the transmitter coil and receiver coil are positioned a predetermined distance above a ground surface in one of a vertical dipole orientation or a horizontal dipole orientation; determining a second apparent conductivity when the transmitter coil and receiver coil are positioned the predetermined distance above the ground surface in the other of the vertical dipole orientation or horizontal dipole orientation; and calculating the correction factor in dependence on the first and second conductivity readings and storing the correction factor. The method further includes applying the correction factor to apparent ground conductivity readings obtained at the survey site by the conductivity meter to generate corrected apparent conductivity readings.

According to another example embodiment is an automated method for calibrating a ground conductivity meter that has a transmitter coil and a receiver coil that are horizontally spaced apart from each other and that is configured to determine apparent conductivity readings for a terrain by using the transmitter coil to induce eddy currents in the terrain and the receiver coil to measure a secondary magnetic field generated in the terrain by the induced eddy currents, the ground conductivity meter having an associated output interface for providing prompts to a human operator and an associated input interface for receiving inputs from the human operator. The calibration method includes issuing a first prompt through the output interface to prompt the operator to position the transmitter coil and receiver coil a predetermined distance above a ground surface in one of a vertical dipole orientation or a horizontal dipole orientation; after issuing the first prompt, monitoring for a first operator input through the input interface indicating that the coils are correctly positioned; upon detecting the first operator input, causing the ground conductivity meter to take a first conductivity reading; after taking the first conductivity reading, issuing a second prompt through the output interface to prompt the operator to position the transmitter coil and receiver coil the predetermined distance above the ground surface in the other of the vertical dipole orientation or the horizontal dipole orientation; after issuing the second prompt, monitoring to determine that the coils have been moved to the correct position for a second conductivity reading; upon determining that the coils have been moved to the correct position for the second conductivity reading, causing the ground conductivity meter to take the second conductivity reading; and calculating a correction factor in dependence on the first and second conductivity readings and storing the correction factor.

DESCRIPTION OF THE FIGURES

FIG. 6 is a front view showing the conductivity meter of FIG. 1 mounted to telescopic pole in the first calibration position;

FIG. 7 is a front view showing the conductivity meter of FIG. 1 mounted to telescopic pole in the second calibration position;

DETAILED DESCRIPTION

Figure 1:
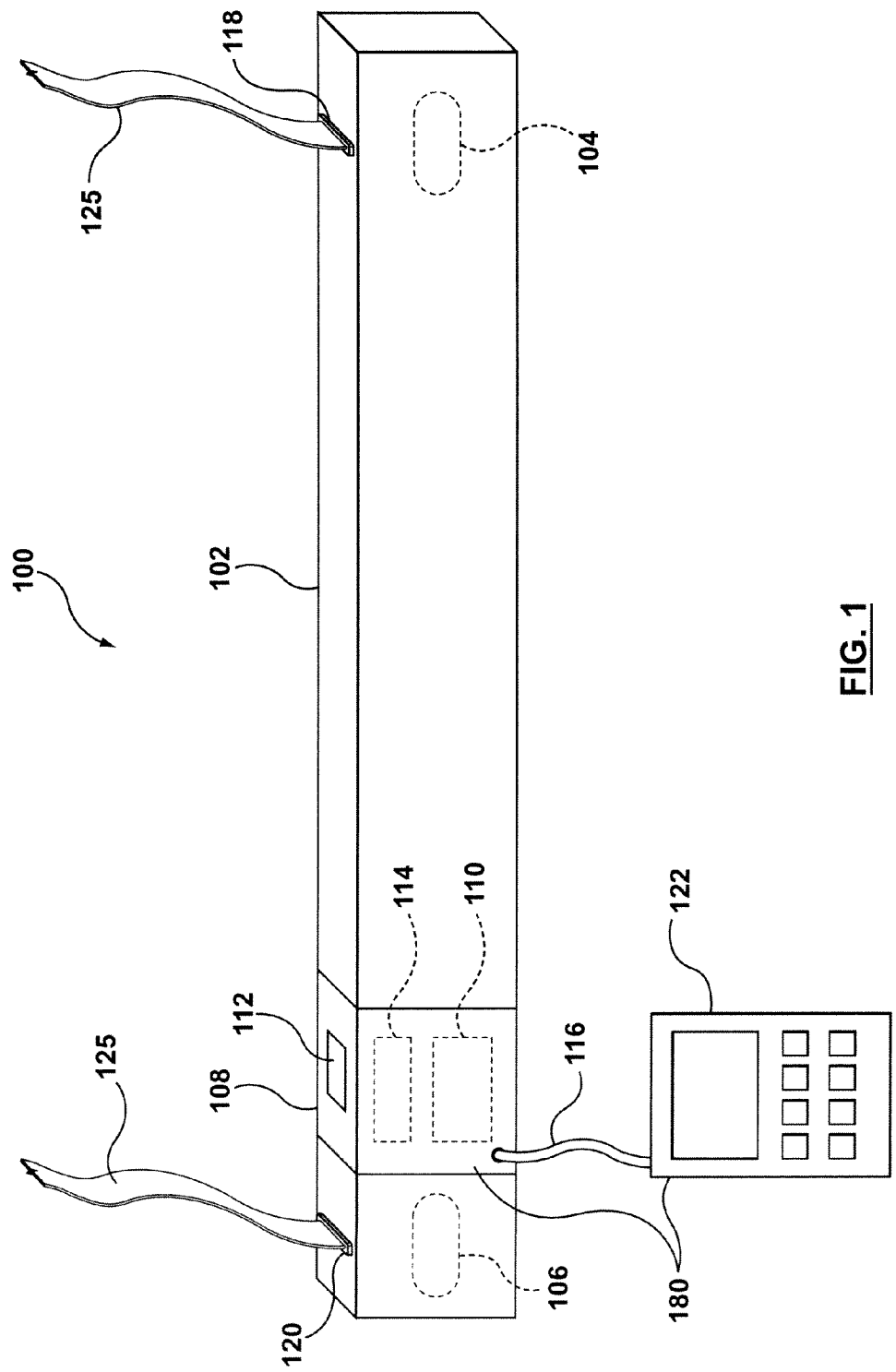
FIG. 1 is a diagrammatic front perspective view of a conductivity meter according to an example embodiment.

A commonly used technique for measuring ground conductivity involves energizing a transmitting coil Tx that is located on or just above the surface of the earth with an alternating current at an audio frequency into a transmitting coil Tx. The time varying magnetic field from this alternating current induces very small eddy currents in the earth, which in turn generate a secondary magnetic field that is sensed by a receiver coil Rx that is located a short distance s away from the transmitting coil Tx.

In general, the secondary magnetic field is a complicated function of the inter-coil spacing s, the operating frequency f, and the ground conductivity σ with the ratio of secondary to primary magnetic field represented by:

$$\frac{Hs}{Hp} = \frac{2}{(\gamma s)^2}\{9 - [9 + 9\gamma s + 4(\gamma s)^2 + (\gamma s)^3]e^{-\gamma s}\}, \quad \text{(Equ. 1)}$$

Where:
Hs=secondary magnetic field at the receiver coil
Hp=primary magnetic field at the receiver coil
$\gamma = \sqrt{i\omega\mu_0\sigma}$
$\omega = 2\pi f$
f=frequency
$\mu_0$=permeability of free space
σ=ground conductivity (Siemen/meter)
s=intercoil spacing (meter)
$i=\sqrt{-1}$ The equation for the field ratio is a complicated function of the variable γs, which is, in turn, a reasonably complex function of the frequency and ground conductivity. However under certain conditions the expression simplifies considerably, as explained in J. D. McNeill, "Geonics Limited Technical Note TN-6—Electronic Terrain Conductivity Measurement at Low Induction Numbers", Geonics Limited, 1980, namely:

$$\frac{Hs}{Hp} \cong \frac{i\omega\mu_0\sigma s^2}{4}, \quad \text{(Equ. 2)}$$

Given the ratio of secondary to primary magnetic fields, the apparent conductivity $\sigma_a$ can be calculated as:

$$\sigma_a = \frac{4}{\omega\mu_0 s^2}\left(\frac{Hs}{Hp}\right), \quad \text{(Equ. 3)}$$

The following example illustrates the relative field relation for a typical small coil separation low frequency electromagnetic (EM) conductivity meter. With an instrument having a 1 meter coil separation between the transmitting and receiving coils and working at a 10 kHz operating frequency over moderately conductive ground of 50 mS/m, the ratio between the secondary and primary field at the receiver coil input will be approximately 0.1%, so that any change in system geometry or component stability will produce a large error in the instrument reading. Note that for proper instrument reading, a signal induced in the receiver coil from the primary field produced by the transmitter coil has to be cancelled out so that only a secondary field is stored as a reference. Thus, the EM conductivity meter must be calibrated so that the effect of the primary field on the receiver coil is "zeroed".

Since it is difficult to maintain zero calibration of the instrument over any long period of time, it is often necessary to re-calibrate an EM conductivity meter in the field, which has been a cumbersome process in the past.

One method for zero calibration has been based on a determination that when the EM ground conductivity meter is located above the ground at a height that is one and a half (1.5) times the transmitter and receiver coil separation distance for the instrument, then the conductivity reading in the vertical dipole (VD) orientation is approximately twice the conductivity reading in the horizontal dipole (HD) orientation.

This relationship is illustrated in the following table 1, which shows calculated values for VD and HD conductivity readings for a conductivity meter located on the ground and at a height that is equal to 1.5 times the separation between the transmitter and receiver coils.

TABLE 1

Calculated VD and HD Conductivity at 1.5 m above ground

| Ground Conductivity σ (mS/m) | Reading on ground σ (mS/m) | | Reading at 1.5 m above ground σ (mS/m) | | Absolute error (mS/m) | | Relative error (%) | |
|---|---|---|---|---|---|---|---|---|
| | VD | HD | VD | HD | VD | HD | VD | HD |
| 10 | 9.74 | 9.87 | 2.92 | 1.5 | 0.08 | 0.08 | 0.8 | 0.8 |
| 30 | 28.7 | 29.3 | 8.27 | 4.26 | 0.25 | 0.25 | 0.9 | 0.9 |
| 100 | 91.9 | 96 | 24.7 | 12.8 | 0.9 | 0.9 | 0.98 | 0.98 |
| 300 | 258 | 279 | 62.4 | 32.5 | 2.6 | 2.6 | 1 | 1 |
| 1000 | 748 | 813 | 152 | 79.9 | 7.8 | 7.8 | 1.04 | 1.04 |

As can be seen from above table, even for highly conductive ground of 100 mS/m, at a height of 1.5 m the variance of the calculated ground conductivity reading is in the range of 1% from the 2 to 1 VD to HD ratio.

Based on the 2 to 1 VD to HD reading ratio, one method for calibrating at a ground conductivity meter is to hold the device above the ground at approximately 1.5 times its coil separation distance, measure the conductivity in both vertical and horizontal coil dipole orientations, adjust the instrument using a calibration knob, and then repeat the measurements and adjustments until the 2 to 1 ratio is achieved. Such a calibration procedure can take three or four or more iterations until the desired ratio is achieved, requiring a great deal of human interaction with the conductivity meter.

Embodiments are described below in which the human interaction required to calibrate a conductivity meter are substantially reduced.

FIG. 1 illustrates an example embodiment of an EM ground conductivity meter 100. The meter 100 includes a rigid elongate frame or case 102 that houses at least one transmitter coil 104 and one receiver coil 106 at opposite ends thereof. In an example embodiment the frame or case 102 includes a component enclosure section 108 which contains electronic components of the apparatus, including an on-board conductivity processor 110 and a signal generator 114.

In an example embodiment, a shoulder strap 125 can be connected to strap mounts 118, 120 that are provided on the case 102 so that the meter 100 can suspended from an operator's shoulder and carried over the terrain that is being surveyed with a bottom surface of the meter 100 located at or near the ground. In some example embodiments the meter 100 may be mounted to a cart or vehicle or some other means for moving it over terrain. In operation, terrain conductivity readings are periodically determined based on measurements made through the receiver coil 106. Conductivity readings may be displayed in real time by a visual output such as a digital display 112, and also recorded in a memory of the conductivity processor 110 within the enclosure 108. In an example embodiment, the meter 100 includes an external logging computer 122 connected to the conductivity processor 110 through a communications link which may include, for example, a wired connection such as a USB (universal serial bus) connection or a wireless connection such as a Bluetooth™ connection. Conductivity readings can also be displayed on a display of the logging computer 122 and stored in a persistent memory of the logging computer 122 instead of or in addition to the conductivity processor 110. In some example embodiments, some or all of the functions of the logging computer 122 can be integrated into the conductivity processor 110 such that a separate logging computer 122 may not be required. Similarly, in some example embodiments at least some or all of the functions of the conductivity processor 110 can be integrated into an external computer 122. In one example embodiment, the receiver coil 106 axis is spaced one (1) meter apart from the axis of the transmitter coil 104, however other separations are possible and one meter is a merely a convenient dimension.

Figure 2:
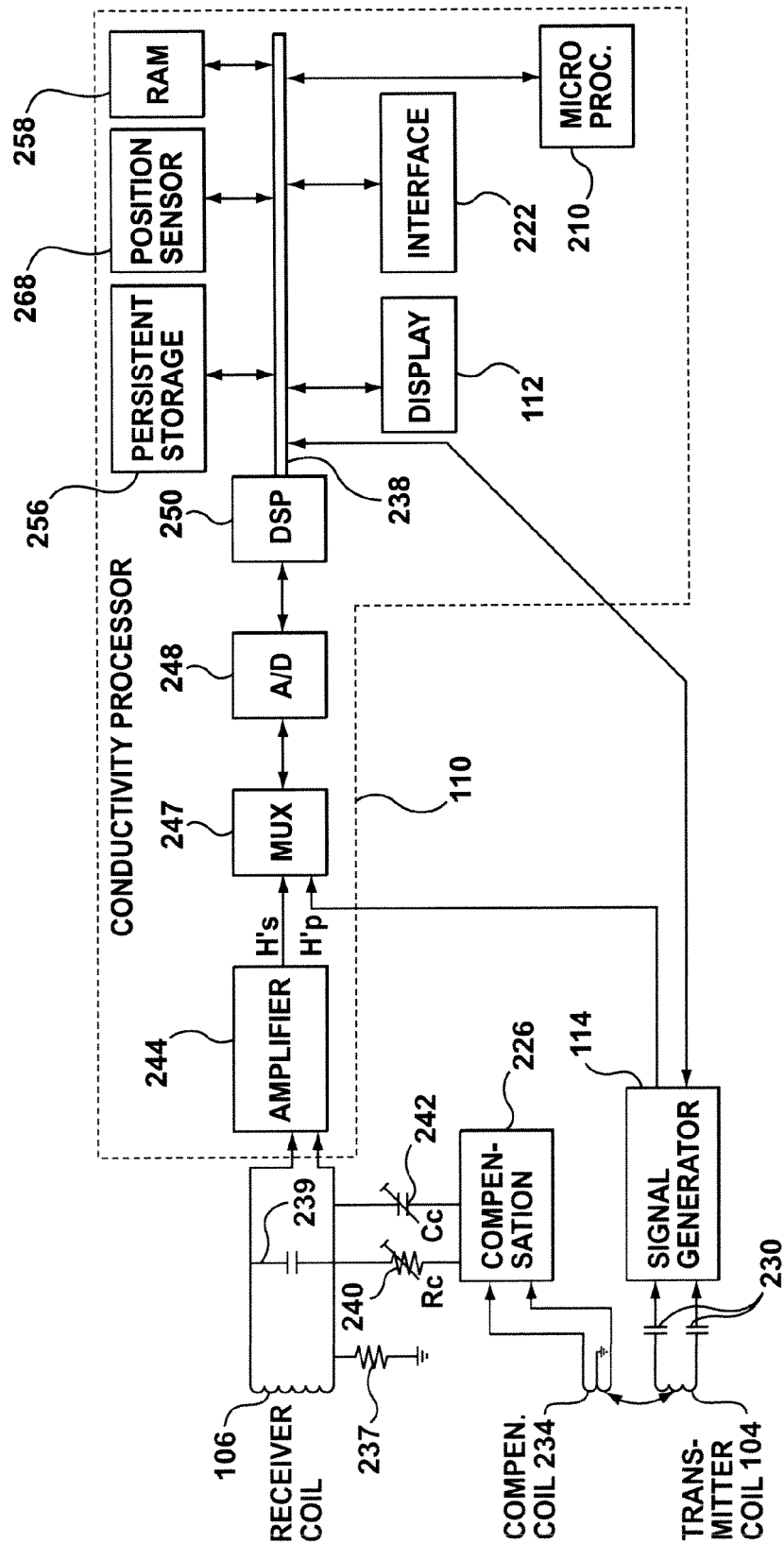
FIG. 2 is a block diagram illustrating of processing circuitry of the conductivity meter of FIG. 1, according to an example embodiment.

Prior to describing calibration of the EM conductivity meter 100, a brief overview of the components and operation of the conductivity meter 100 and logging computer 122 will be provided. With reference to FIG. 2, in an example embodiment, the electronic components housed within the component enclosure 108 include a transmitter signal generator 114, and a received signal processor that includes a compensation network 226 and conductivity processor 110. The signal generator 114 is configured to generate an AC current of a predetermined frequency and amplitude, and thus will typically include an oscillator and appropriate amplification components. The signal generator 114 is coupled through a pair of tuning capacitors 230 to apply the AC current to transmitter coil 104.

The receiver coil 106, which is coplanar with the transmitter coil 104, picks up a primary signal transmitted by the transmitter coil 104 and a secondary signal set up by currents induced in the terrain by the primary signal. Using techniques known in the art, in order to avoid the secondary signal being swamped by the primary signal, a reference coil 234 tightly coupled with the transmitter coil 104 is used to supply a component of a cancellation signal applied to the receiver coil 106 through an analog compensation summing network that includes a compensation resistor 237 or by inductive coupling such that the cancellation signal component is applied in antiphase to the primary signal received by the receiver coil 106 directly from the transmitter coil 104. The resistor 237 generates a primary field compensation voltage (Vc) as a result of currents (Ic) applied through a compensation network 226 ($Vc=IcR_{237}$). An tuning capacitor 239 can be included in the circuit. The compensation network 226 provides preset adjustment 240 of the in-phase amplitude, and a present adjustment 242 of the quadrature phase of the component applied (i.e. the component leading the component that was applied by 90 degrees) so that the compensation network 226 acts to cancel the primary signal received by the receiver coil 106. As will be described in greater detail below, the compensation network's ability to completely cancel the primary signal effect can vary, and thus device calibration from time to time may be required for optimal accuracy in at least some operating environments.

The remaining un-cancelled signal from the receiver coil 106 is passed through to the conductivity processor 110. In conductivity processor 110, the remaining un-cancelled signal from the receiver coil is provided to an amplification network 244, which provides an output signal Hs' that is proportional to the secondary signal, and hence representative of the secondary field Hs. Such output is provided to a multiplexer 247, which also receives directly from the signal generator 114 a signal Hp' that is proportional to the primary signal generated by the transmitter coil 104, and hence representative of the primary field Hp. These primary and secondary field signals are multiplexed and provided to an analog to digital converter 248, and the sampled values output from converter 248 provided to a digital signal processor (DSP) 250. The DSP 250, having access to the values Hs' and Hp' that are representative of the secondary and primary fields respectively, is configured to determine the apparent conductivity $\sigma_a$ of the terrain being measured. Such determination is based on Equation 3 noted above (the frequency f of the primary current, the spacing s between the transmitter and receiver coils being known values), with the DSP 250 either being configured to perform the calculation in real time or to access a look up table in a persistent storage element 256 (which may be flash memory for example) to determine the apparent conductivity based on pre-calculated values. As the primary signal will generally be a constant AC profile, the variable in Equation 3 will typically be the secondary field Hs.

In an example embodiment, the determined apparent conductivity can be displayed on the digital display 112 so that the operator can visually associate any anomalies in the conductivity to the location at which they occur. Additionally, the determined apparent conductivity can be stored in a writable portion in one or both of persistent memory 256 or RAM 258. If desired terrain resistivity, being the reciprocal of conductivity, can be determined and displayed or stored in place of or addition to conductivity.

The conductivity processor 110 further includes a microprocessor 210 and oscillator circuit 252 for providing overall control and timing, respectively of the operation of the components of the conductivity processor 110. The program memory 56 includes a persistent portion that includes the operating instructions used by the components of the conductivity processor 110. A system bus 238 interconnects the digital components of the conductivity processor 110. A short range communications interface 222 (for example a USB or Bluetooth™ interface) is provided for communications with external devices such a logging computer 122. The conductivity may also include one or more positional sensors 268 such as gyroscope and/or a global positioning system (GPS) receiver to sense the orientation and location of the conductivity meter 100 at any given time. It will be appreciated that the functionality of conductivity processor 110 could be realized in any number of ways as alternatives to the configuration shown in FIG. 2. For example, an analog circuit or a circuit that included temperature compensation such as disclosed in U.S. Pat. No. 4,070,612 could be used, or a circuit with compensating features such as shown in U.S. Pat. No. 6,710,599 could be used. Alternatively, the external logging computer 122 could be used with an analog to digital converter and suitable amplifier and multiplexer components to implement the conductivity processor 110.

Figure 3:
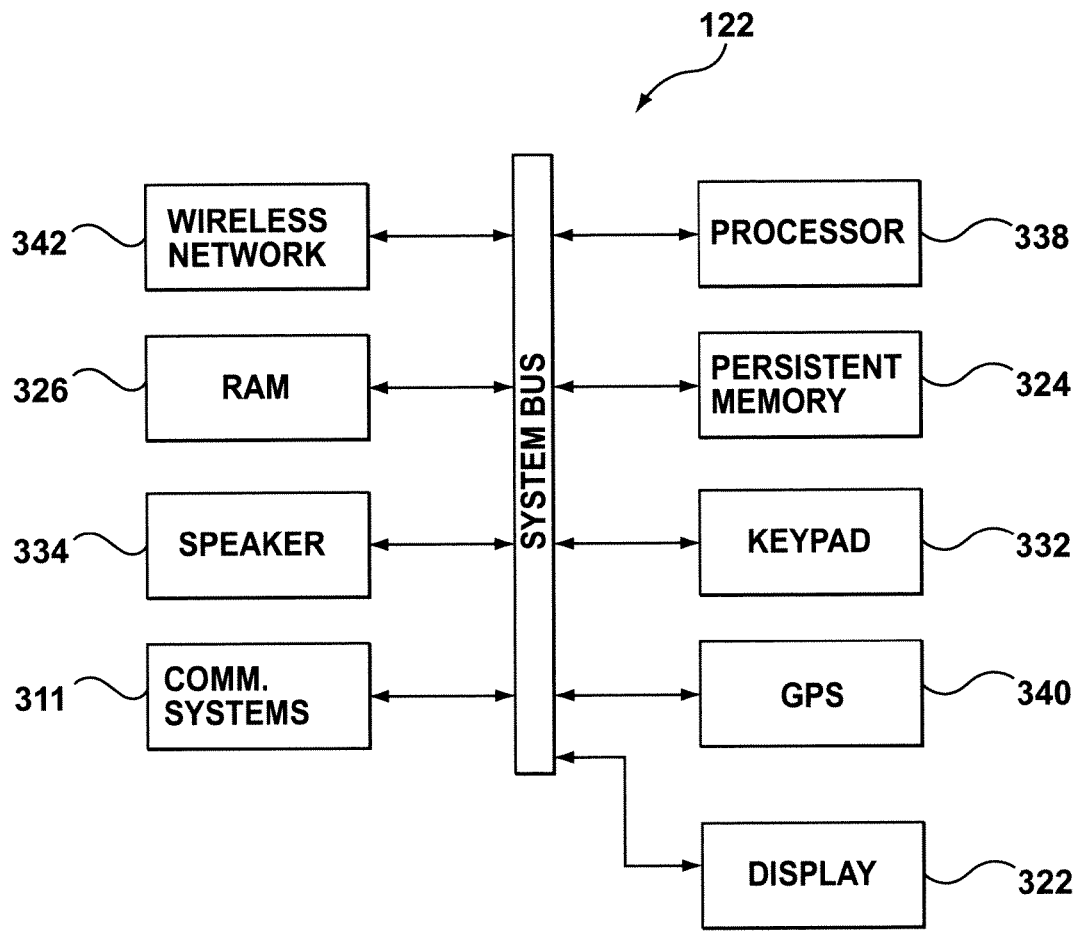
FIG. 3 is a block diagram illustrating circuitry of a logging computer of the conductivity meter of FIG. 1.

FIG. 3 shows a block diagram of an example embodiment of a logging computer 122. In at least one example, the logging computer 122 is a hand held computing device that includes a communications interface 311 (for example a USB interface or a Bluetooth™ interface) for exchanging information with the conductivity processor 110. The logging computer 122 includes a microprocessor 338 that controls the overall operation of the logging computer 122. The microprocessor 338 interacts with the communications interface 311 and also interacts with further device subsystems such as a display 322, persistent memory 324, random access memory (RAM) 326, keyboard or keypad 332, speaker 334, and other device subsystems. In at least one example embodiment the logging computer 122 includes a Global Position System (GPS) receiver sub-system 340 so that one or both of the logging computer and the conductivity processor 110 can track positional data for the conductivity reading that are taken. Display 322 may be a touch screen display to facilitate user input to the logging computer 122. The logging computer 122 can also include a two-way wireless network communications subsystem 342 so that information can be exchanged with a remote station through a wireless communications link that may include for example one or more of a satellite network or a cellular network. In example embodiments, the logging computer 122 and the conductivity processor 110 are each preprogrammed to operate in the manner described herein through processor instructions stored in persistent memory 324, 256, respectively.

Collectively, the logging computer 122 and the electrical and electronic components of the conductivity meter 100 (including signal generator 114, compensation circuit 226 and conductivity processor 110) provide a conductivity meter controller 180, and it will be appreciated that the allocation of functions among the various components of the conductivity meter controller 180 can vary in different embodiments without affecting the overall operation of the calibration procedure described herein.

An overview of the components of the conductivity meter 100 having been provided, calibration of the conductivity meter according to example embodiments will now be described.

As noted above, a compensation coil 234 and compensation network circuit 226 are included in the ground conductivity meter 100 to cancel out the effect of the primary signal from the transmitter coil 104 on the receiver coil 106 such that the secondary signal that is representative of the secondary magnetic field generated in the ground can be isolated. However, the accuracy of the conductivity processor, and the compensation coil and compensation network circuit in completely cancelling the primary signal effect, can vary depending on factors such as electronic drift that can be affected by changes in operating conditions such as changes in temperature, which can introduce an error value into the apparent conductivity readings calculated by the conductivity processor 110. Embodiments described herein relate to a conductivity meter and system that is allows a correction factor that is representative of this error value to be determined during a calibration procedure and then subsequently used to correct survey conductivity readings.

Figure 4:
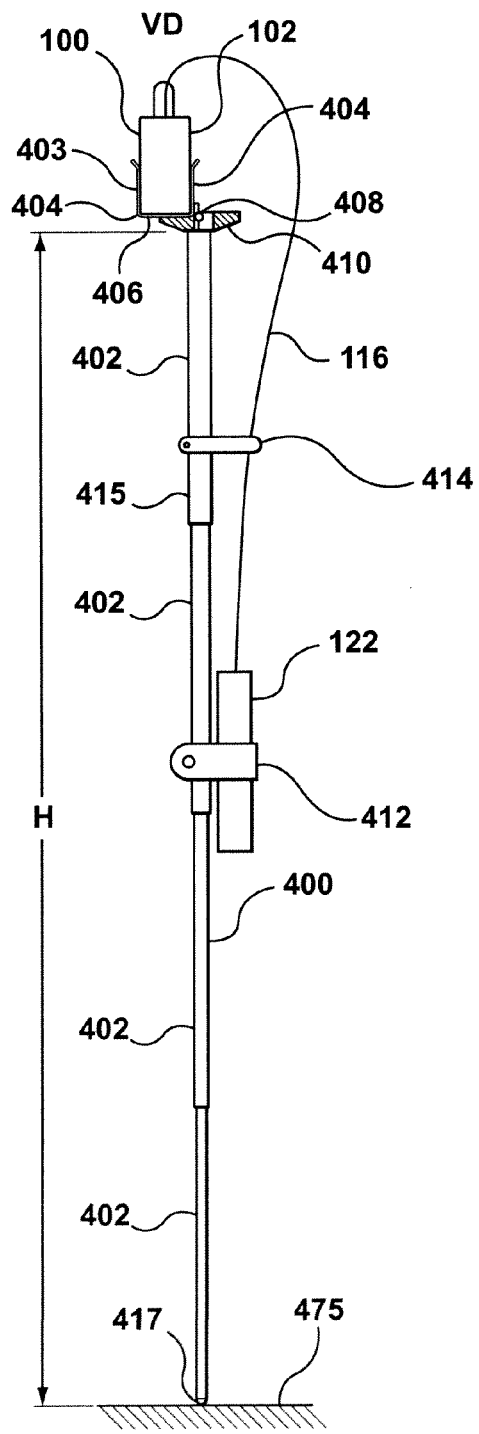
FIG. 4 is a side view showing the conductivity meter of FIG. 1 mounted to telescopic pole in a first calibration position.
Figure 5:
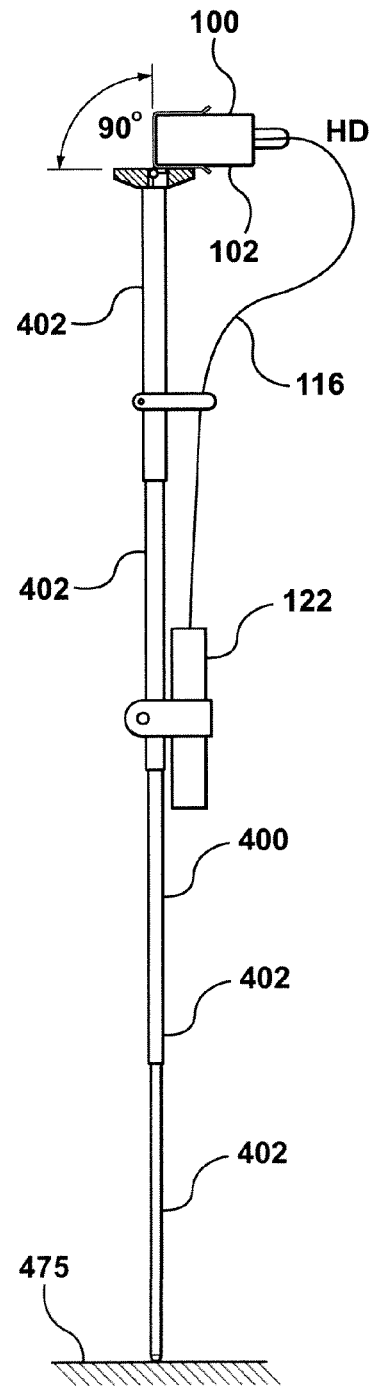
FIG. 5 is a side view showing the conductivity meter of FIG. 1 mounted to telescopic pole in a second calibration position.

Referring to FIGS. 4 to 7, in an example embodiment a support assembly 415 that includes a rigid support pole 400 is provided for use with the conductivity meter 100 in order to support the conductivity meter case 102 at a desired height H and in a substantially level position above ground level 475 during a calibration procedure. FIGS. 4 and 6 show side and front views, respectively, of the conductivity meter 100 with the transmitter and receiver coils in a vertical dipole (VD) orientation, and FIGS. 5 and 7 show side and front views, respectively, of the conductivity meter 100 with the transmitter and receiver coils in a horizontal dipole (HD) orientation. In the illustrated example, the rigid pole 400 is a retractable telescopic monopod that is formed of a plurality of telescopic sections 402 that are each formed of a light, composite, non conductive material. The rigid pole 400 is dimensioned such that when it is extended it supports the conductivity meter 100 at a height H that is 1.5 times the separation distance between axis of the transmitter and receiver coils 104, 106. Thus, in an example embodiment where the coil separation is one meter, the height H will be approximately 1.5 m.

The support assembly 415 includes a holder or bracket 403 at an upper end of the support pole 400 for releasably engaging the conductivity meter 100, and a bottom end 417 for resting on the ground 475. Although many bracket configurations are possible, in the illustrated embodiment, the bracket 403 has a U shaped configuration and includes opposed sides 404 that are joined by a base 406 for frictionally engaging a center area of the case 102 of conductivity meter 100. The bracket 403 is pivotally mounted by a hinge assembly 408 to a support 410 located at the upper end of pole 400 such that the conductivity meter case 102 can be partially rotated 90 degrees between the coil vertical dipole (VD) orientation shown in FIGS. 4 and 6 and the coil horizontal dipole (HD) orientation shown in FIGS. 5 and 7.

In an example embodiment, a logging computer holder 412 is fastened to one of the pole sections 402 for releasably securing the logging computer 122 to the pole 400.

Figure 8A:
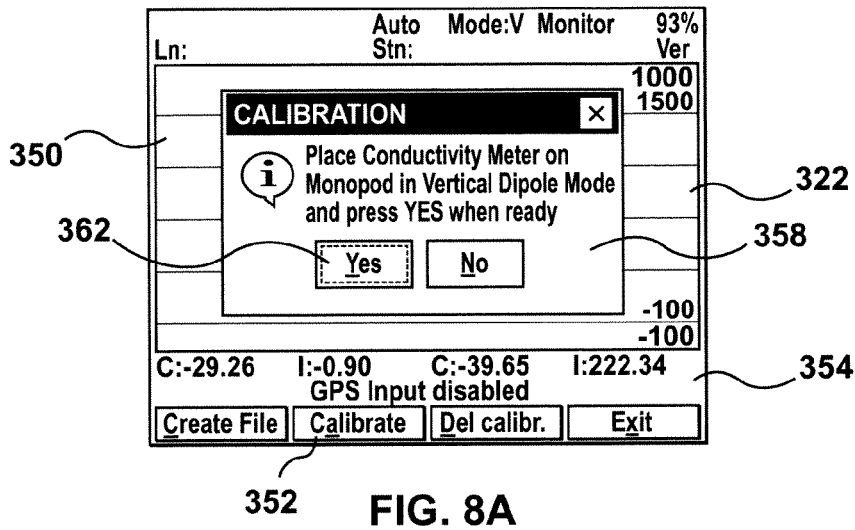
FIGS. 8A to 8F illustrate user interface screens displayed during a calibration procedure according to example embodiments.

In an example embodiment the logging computer 122 is configured to facilitate calibration of the conductivity meter 100, as will now be explained with reference to FIGS. 8A to 8F which each show an interactive user interface screen 350 that is displayed on the display 322 of logging computer 122. As seen in FIG. 8A, the user interface screen 350 includes a user selectable "Calibrate" option that is represented on screen 350 by a user selectable "Calibrate" icon or button 352. The calibration option may be selected by a user for example, at the beginning of a day, after a battery change for the conductivity meter, when arriving at a new survey site, and/or when there has been a change in temperature throughout the survey duration, among other times. In example embodiments, a user can start the calibration procedure by pressing a designated key on keypad 332 (for example an "a" key), or by selecting the on-screen calibrate button 352 either by touching the display 322 at the appropriate spot or using navigation keys on keypad 332.

Once the calibration procedure has been started, as shown in FIG. 8A, the user 600 is presented in interface 350 with a prompt in the form of a window 358 that includes instructions to place the conductivity meter 100 in a vertical dipole orientation on the monopod support pole 400, as is shown in FIGS. 4 and 6. The user is prompted to select a "Yes" button 362 to indicate to the logging computer 100 when the conductivity meter 100 is properly positioned. In an alternative example embodiment, readings from positional sensors such as sensor 268 of the conductivity meter 100 can be used by the logging computer 122 to double check that the conductivity meter 100 is in the correct position or to automatically indicate that the conductivity meter is in the correct position.

Figure 8B:
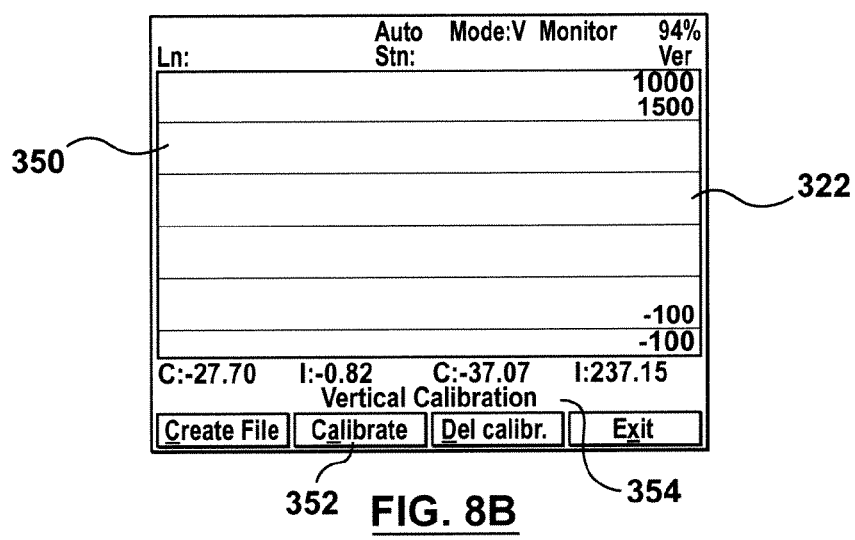

Once the conductivity meter is correctly positioned, the logging computer 122 instructs the conductivity processor 110 to take a vertical dipole conductivity reading $\sigma_{VD}$, and the logging computer 122 receives and stores the result. As indicated in FIG. 8B in one example embodiment, the user interface screen 350 includes a message region 354 that provides feedback to a user as to the current status of the calibration procedure. In FIG. 8B, while the vertical dipole conductivity reading $\sigma_{VD}$ is being determined, the message region 354 displays a message such as "Vertical Calibration" to prompt the user to wait and hold the support 400 and conductivity meter 100 steady while the vertical conductivity reading $\sigma_{VD}$ is taken.

Figure 8C:
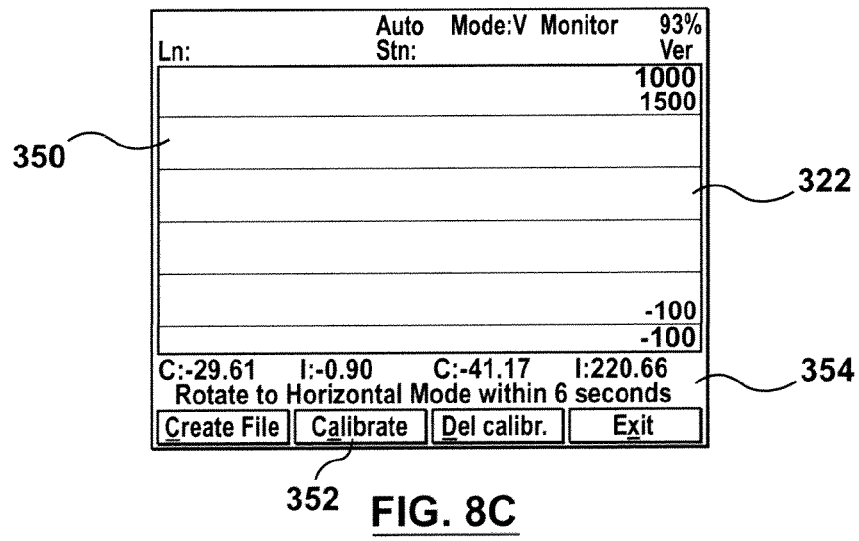

After the vertical dipole reading is completed, which may for example take a few seconds, the logging computer 122 will issue an audible beep or other audible prompt on speaker 334, and as shown in FIG. 8C, display a message in the message area 354 instructing the user 600 to rotate the conductivity meter 100 to the horizontal dipole position (which is shown in FIGS. 5 and 7). In some example embodiments, the logging computer 122 is configured to terminate the calibration procedure if the calibration meter 100 is not rotated to the horizontal position within a predetermined time interval after completing the vertical dipole reading. For example, the predetermined time out duration in the illustrated embodiment is approximately 6 seconds, and so the message in message region 352 of FIG. 8C states "Rotate to Horizontal Mode within 6 seconds"—it will be appreciated that 6 seconds is merely an illustrative example of a time limit and shorter or longer time periods can be used. If the conductivity meter 100 is not rotated within the allotted time out duration, the logging computer 110 terminates the calibration procedure and displays a message such as "Horizontal Mode Failed—Wait for Beep".

Figure 8D:
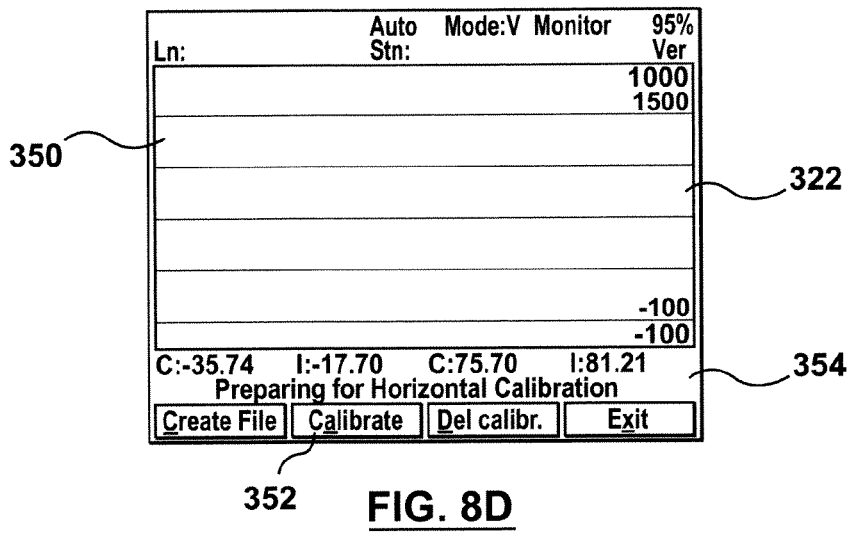
Figure 8E:
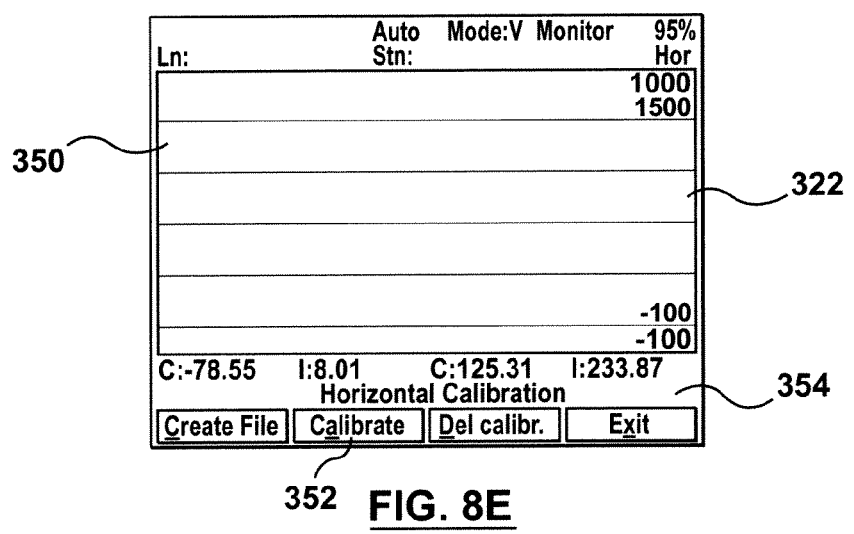
Figure 8F:
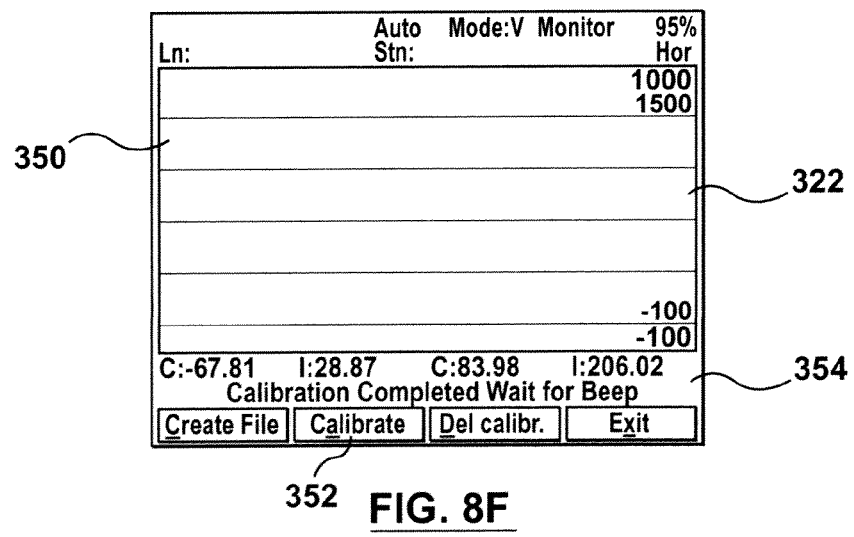

While waiting for the time-out duration to expire, in an example embodiment, the logging computer 122 is configured to determine based on information received from the position sensor 268 of the conductivity processor 110 if the conductivity meter 100 is rotated from the vertical dipole position of FIGS. 4 and 6 to the horizontal dipole position of FIGS. 5 and 7. If rotation is detected, then logging computer 122 automatically proceeds with instructing the conductivity processor 110 to take a horizontal dipole conductivity reading $\sigma_{HD}$, and the logging computer 122 then receives and stores the resulting horizontal dipole conductivity reading $\sigma_{HD}$. In particular, as shown in FIG. 8D, in the illustrated example embodiment, once rotation of the conductivity meter 100 is detected, the message "Preparing for Horizontal Calibration" is displayed in message region 354, and after a small delay to allow for stabilization the horizontal dipole conductivity reading $\sigma_{HD}$ is taken while the message "Horizontal Calibration" is displayed in the message region 354, as shown in FIG. 8E.

In at least one alternative embodiment, the horizontal dipole reading is not automatically conducted after rotation of the conductivity meter 100, but rather the logging computer 122 waits for user input to confirm that the meter is ready for the horizontal dipole reading.

Once both the vertical dipole conductivity reading $\sigma_{VD}$ and the horizontal dipole conductivity reading $\sigma_{HD}$ have been taken, the logging computer 122 determines and stores a correction factor $\Delta V$ based on the following expression:

$$\Delta V = 2\sigma_{HD} - \sigma_{VD} \quad \text{(Equ. 4)}$$

The correction factor takes into account the determination noted above that at a height of at least 1.5 times the coil separation, the horizontal dipole conductivity reading should substantially be twice the vertical dipole conductivity reading.

In one example embodiment, while the correction factor $\Delta V$ is being determined, the logging computer 122 displays a message such as "Calibration Completed—Wait for Beep" in message area 354, and after the correction factor $\Delta V$ is determined and stored, and audible beep is generated on speaker 334 and the logging computer 122 returns to a normal mode of operation. In an example embodiment, the correction factor $\Delta V$ is stored at one or both of the persistent storage elements 256, 324 of the conductivity processor 110 and the logging computer 122.

Although in the procedure described above the vertical dipole reading is taken before the horizontal dipole reading, this order can be reversed and the horizontal dipole reading could be taken before the vertical dipole reading in some embodiments.

Figure 9:
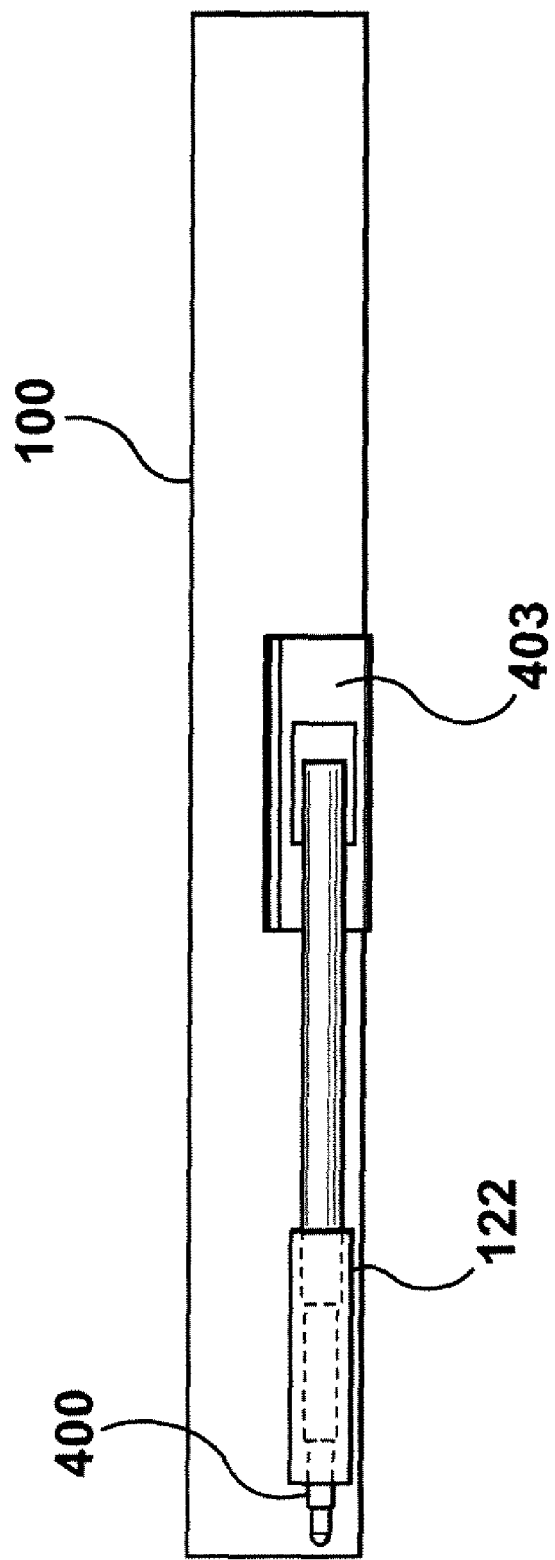
FIG. 9 is a front view showing the conductivity meter and logging computer of FIG. 1 mounted to telescopic pole in a use position.

In a normal survey mode, the support pole 400 is either detached from conductivity meter 100 or is retracted and folded into a storage position that is parallel to the conductivity meter 100 so that the conductivity meter 100 can be moved about the survey site suspended from a user's shoulder with the bottom of the case 102 located at or near ground level. In this respect, in one example embodiment, the support 410 is pivotally connected to the top end of pole 400 to allow the pole 400 to be folded in a retracted position parallel to the conductivity meter 100 as is shown in FIG. 9.

In the normal survey mode of operation of the conductivity meter 100, the conductivity processor 110 determines, in dependence for example on a conductivity equation such as equation 3, a series of apparent conductivity readings $\sigma_a$ at various locations throughout the site being surveyed. The conductivity readings $\sigma_a$ (which may or may not be temperature compensated by the conductivity processor 110 using known techniques) are passed to the logging computer 122 which then applies the correction factor $\Delta V$ to each of the conductivity readings $\sigma_a$ to automatically calculate a calibrated or corrected conductivity reading $\sigma_c$. In particular, in some example embodiments, the correction factor $\Delta V$ is subtracted from each conductivity readings $\sigma_a$ to provide a series of corrected conductivity reading $\sigma_c$.

In an example embodiment each conductivity reading $\sigma_a$ is provided by the conductivity processor 110 in real time as it is determined during a site survey to the logging computer 122 which then immediately calculates an associated corrected conductivity reading $\sigma_c$, and both the raw conductivity reading $\sigma_a$ and corrected conductivity reading $\sigma_c$ are stored in one or both of the RAM 326 or persistent memory 324 of the logging computer along with associated positional information derived from GPS receiver 340 and/or other positional sensors 268. At the completion of a site survey, the survey data including the raw conductivity readings $\sigma_a$ and corrected conductivity readings $\sigma_c$, correction factor $\Delta V$ and associated positional data can be uploaded from the logging computer 122 for further processing and analysis. In a situation where the conductivity meter is re-calibrated during a site survey, the new correction factor(s) $\Delta V$ can be included with the data set stored at the logging computer 122 for the survey, with each correction factor being associated with the set of conductivity readings that it has been applied to. In some example embodiments, the raw conductivity readings $\sigma_a$ are discarded once the corrected conductivity readings $\sigma_c$ are determined and stored at the logging computer as the correction factor $\Delta V$ that is saved in association with the corrected conductivity readings that it has been applied to allows the raw conductivity data to be derived later if required.

In at least some example embodiments or operational modes, the conductivity readings need not be corrected in real time, but could be stored and then the correction factor $\Delta V$ applied at a future time either at the logging computer 122 or at a computer where the data is uploaded for further processing. Also, the correction factor $\Delta V$ could be applied to the raw conductivity readings $\sigma_a$ at the conductivity processor 110 instead of the logging computer 122 and the corrected conductivity readings $\sigma_c$ displayed in real time on the conductivity processor display screen 112.

In some example embodiments the use of a support pole 400 during the calibration procedure provides some assurance that the conductivity meter 100 is supported at the required height during the procedure, reducing the opportunity for user-induced errors. However in some example embodiments, the calibration process could be used with a support of known height having a configuration other than support pole 400, and in some embodiments no support may be used other than reliance on an operator to hold the meter at the necessary height.

It will be appreciated that in at least some example embodiments, the calibration system and procedure described herein can be time efficient and easy to perform and reduce the opportunity for operator-introduced errors. The calibration procedure can be used to reduce error introduced by the primary field.

By way of non-limiting example, the automated calibration system and method described herein can be applied to the EM38 family of conductivity meters available from the assignee Geonics Limited.

The embodiments described above are example embodiments and variations are possible.

The invention claimed is:

1. A ground conductivity meter comprising:
a transmitter coil and a receiver coil that are horizontally spaced apart from each other; and
a conductivity meter controller connected to the transmitter and receiver coils and including an electronic storage element and at least one processor, the conductivity meter controller being operative to:
determine a first conductivity reading in dependence on signals from the receiver coil when the transmitter coil and receiver coil are positioned a predetermined distance above a ground surface in one of a vertical dipole orientation or a horizontal dipole orientation;
determine a second conductivity reading in dependence on signals from the receiver coil when the transmitter coil and receiver coil are positioned the predetermined distance above the ground surface in the other of the vertical dipole orientation or horizontal dipole orientation;
calculate a correction factor in dependence on the first and second conductivity readings and store the correction factor in the storage element; and
determine a plurality of further conductivity readings in dependence on signals from the receiver coil during a site survey, and apply the stored correction factor to the further conductivity readings to produce corrected conductivity readings for the site survey.

2. The ground conductivity meter of claim 1 wherein the predetermined distance above the ground surface is at least 1.5 times a distance that the receiver coil is horizontally spaced from the transmitter coil.

3. The ground conductivity meter of claim 2 wherein the correction factor is determined in dependence on a relationship:

$$\Delta V = 2\sigma_{HD} - \sigma_{VD}$$

Where:
$\Delta V$ is the correction factor,
$\sigma_{HD}$ is the conductivity reading when the transmitter coil and receiver coil are positioned the predetermined distance above the ground surface in the horizontal dipole orientation, and
$\sigma_{VD}$ is the conductivity reading when the transmitter coil and receiver coil are positioned the predetermined distance above the ground surface in the vertical dipole orientation.

4. The ground conductivity meter of claim 3 wherein the correction factor is summed with each of the further conductivity readings to produce the corrected conductivity readings for the site survey.

5. The ground conductivity meter of claim 1 wherein the transmitter coil and receiver coil are housed within a rigid case, the ground conductivity meter further including a support assembly having a bracket engaging the rigid case and having a lower end for engaging the ground surface, the support assembly being dimensioned to support the case substantially at the predetermined distance above the ground surface.

6. The ground conductivity meter of claim 5 wherein the bracket is pivotally mounted at an upper end of the support assembly for movement between a first position in which the receiver coil and the transmitter coil are positioned the predetermined distance above the ground surface in the vertical dipole orientation and a second position in which the receiver coil and the transmitter coil are positioned the predetermined distance above the ground surface in the horizontal dipole orientation.

7. The ground conductivity meter of claim 6 comprising a positional sensor for indicating to the conductivity meter controller when the receiver coil and the transmitter coil are moved between the vertical dipole orientation and the horizontal dipole orientation, the controller being operative to automatically determine the second conductivity reading upon receiving, after determining the first conductivity reading, an indication from the positional sensor that the receiver coil and the transmitter coil have moved between the vertical dipole orientation and the horizontal dipole orientation.

8. The ground conductivity meter of claim 6 wherein the support assembly includes a telescopic pole that extends to support the rigid case at a height that is at least 1.5 times the spacing between the transmitter and receiver coils.

9. The ground conductivity meter of claim 1 wherein the conductivity meter controller includes an output interface for providing prompts to a human operator and an input interface for receiving inputs from the human operator, and wherein the conductivity meter controller is operative to, as part of a calibration procedure: (a) prior to determining the first conductivity reading, issue a first prompt through the output interface to prompt the operator to position the transmitter coil and receiver coil the predetermined distance above the ground surface in one of the vertical dipole orientation or the horizontal dipole orientation; (b) after issuing the first prompt, determine the first conductivity reading upon receiving an operator input through the input interface indicating that the coils are correctly positioned; (c) subsequent to determining the first conductivity reading and prior to determining the second conductivity reading, issue a second prompt through the output interface to prompt the operator to position the transmitter coil and receiver coil the predetermined distance above the ground surface in the other of the vertical dipole orientation or the horizontal dipole orientation; and (d) after issuing the second prompt, determine the second conductivity reading upon detecting that the transmitter coil and the receiver coil has been moved to the correct position for the second conductivity reading.

10. The ground conductivity meter of claim 9 wherein the conductivity meter controller includes a positional sensor for automatically detecting that the transmitter coil and the receiver coil has been moved to the correct position for the second conductivity reading.

11. The ground conductivity meter of claim 1 wherein the transmitter coil and the receiver coil are mounted to an elongate rigid frame and wherein the conductivity meter controller includes:
- a signal generator housed within the rigid frame and connected to the transmitter coil to supply a time-varying current thereto for inducing current in the ground;
- a compensation circuit housed within the rigid frame for at least partially isolating from signals received by the first receiver coil secondary signals representative of a secondary magnetic field generated in the ground by the eddy currents;
- a conductivity processor housed within the rigid frame for determining the further ground conductivity readings in dependence on the at least partially isolated secondary signals; and
- a logging computer that is separate from the rigid frame and connected to the conductivity processor by a communications link through which the logging computer receives the further ground conductivity readings, the logging computer being configured to apply the stored correction factor to the further ground conductivity readings to produce the corrected conductivity readings for the site survey.

12. A method for calibrating and operating a ground conductivity meter comprising:
- providing a ground conductivity meter that has a transmitter coil and a receiver coil that are horizontally spaced apart from each other and that is configured to determine apparent conductivity readings for a terrain by using the transmitter coil to induce eddy currents in the terrain and the receiver coil to measure a secondary magnetic field generated in the terrain by the induced eddy currents, wherein error can be introduced into the apparent conductivity readings;
- at a survey site, determining a correction factor for mitigating against the error introduced into the apparent conductivity readings, wherein determining the correction factor includes:
  - determining a first apparent conductivity reading when the transmitter coil and receiver coil are positioned a predetermined distance above a ground surface in one of a vertical dipole orientation or a horizontal dipole orientation;
  - determining a second apparent conductivity when the transmitter coil and receiver coil are positioned the predetermined distance above the ground surface in the other of the vertical dipole orientation or horizontal dipole orientation; and
  - calculating the correction factor in dependence on the first and second conductivity readings and storing the correction factor; and
- applying the correction factor to apparent ground conductivity readings obtained at the survey site by the conductivity meter to generate corrected apparent conductivity readings.

13. The method claim 12 wherein the predetermined distance above the ground surface is at least 1.5 times a distance that the receiver coil is horizontally spaced from the transmitter coil, and the correction factor is determined in dependence on a relationship:

$$\Delta V = 2\sigma_{HD} - \sigma_{VD}$$

Where:
$\Delta V$ is the correction factor, $\sigma_{HD}$ is the conductivity reading when the transmitter coil and receiver coil are positioned the predetermined distance above the ground surface in the horizontal dipole orientation, and $\sigma_{VD}$ is the conductivity reading when the transmitter coil and receiver coil are positioned the predetermined distance above the ground surface in the vertical dipole orientation.

14. The method of claim 13 wherein the correction factor is subtracted from each of the apparent ground conductivity readings to produce the corrected conductivity readings.

15. The method of claim 12 wherein the transmitter coil and receiver coil are housed within a rigid case, further including providing a support assembly having a bracket engaging the rigid case and having a lower end for engaging the ground surface, the support assembly being dimensioned to support the case substantially at the predetermined distance above the ground surface.

16. An automated method for calibrating a ground conductivity meter that has a transmitter coil and a receiver coil that are horizontally spaced apart from each other and that is configured to determine apparent conductivity readings for a terrain by using the transmitter coil to induce eddy currents in the terrain and the receiver coil to measure a secondary magnetic field generated in the terrain by the induced eddy currents, the ground conductivity meter having an associated output interface for providing prompts to a human operator and an associated input interface for receiving inputs from the human operator, the calibration method comprising:
- issuing a first prompt through the output interface to prompt the operator to position the transmitter coil and receiver coil a predetermined distance above a ground surface in one of a vertical dipole orientation or a horizontal dipole orientation;
- after issuing the first prompt, monitoring for a first operator input through the input interface indicating that the coils are correctly positioned;
- upon detecting the first operator input, causing the ground conductivity meter to take a first conductivity reading;
- after taking the first conductivity reading, issuing a second prompt through the output interface to prompt the operator to position the transmitter coil and receiver coil the predetermined distance above the ground surface in the other of the vertical dipole orientation or the horizontal dipole orientation;
- after issuing the second prompt, monitoring to determine that the coils have been moved to the correct position for a second conductivity reading;
- upon determining that the coils have been moved to the correct position for the second conductivity reading, causing the ground conductivity meter to take the second conductivity reading; and
- calculating a correction factor in dependence on the first and second conductivity readings and storing the correction factor.

17. The method claim 16 wherein the predetermined distance above the ground surface is at least 1.5 times a distance that the receiver coil is horizontally spaced from the transmitter coil, and the correction factor is determined in dependence on a relationship:

$$\Delta V = 2\sigma_{HD} - \sigma_{VD}$$

Where:
$\Delta V$ is the correction factor, $\sigma_{HD}$ is the conductivity reading when the transmitter coil and receiver coil are positioned the predetermined distance above the ground surface in the horizontal dipole orientation, and $\sigma_{VD}$ is the conductivity reading when the transmitter coil and receiver coil are positioned the predetermined distance above the ground surface in the vertical dipole orientation.

18. The method of claim 17 wherein if a predetermined time period passes during monitoring to determine that the coils have been moved to the correct position for a second conductivity reading and the coils have not been moved to the correct position during the predetermined time period the calibration method is automatically terminated.

19. The method of claim 16 wherein monitoring to determine that the coils have been moved to the correct position for the second conductivity reading comprises monitoring a positional sensor of the ground conductivity meter.

20. The method of claim 16 wherein the correction factor represents an error introduced into apparent conductivity readings by the conductivity meter, the method further including subtracting the correction factor with each of a plurality of apparent conductivity readings made by the conductivity meter subsequent to the calculation of the correction factor.

21. A conductivity meter controller having at least one microprocessor and electronic storage element, the controller being configured to perform the calibration method of claim 16.

* * * * *